June 15, 1926.

L. V. ARONSON 1,589,087

REFLECTING SPARKLER

Filed August 21, 1924

Inventor
Louis V. Aronson

By Browne & Phelps
Attorneys

Patented June 15, 1926.

1,589,087

UNITED STATES PATENT OFFICE.

LOUIS V. ARONSON, OF NEWARK, NEW JERSEY.

REFLECTING SPARKLER.

Application filed August 21, 1924. Serial No. 733,329.

The invention relates to toys of the sparkling type and has an object the provision of a sparkler having means to reflect the rays of light emitted by the sparks so as to increase the effect of the illumination.

The invention is an improvement upon the form of toy shown by my co-pending application Serial No. 726,523, filed July 17, 1924, patented October 27, 1925, as Patent No. 1,558,450.

An illustrative embodiment of the invention is shown in the accompanying drawings in which.

Figure 1:
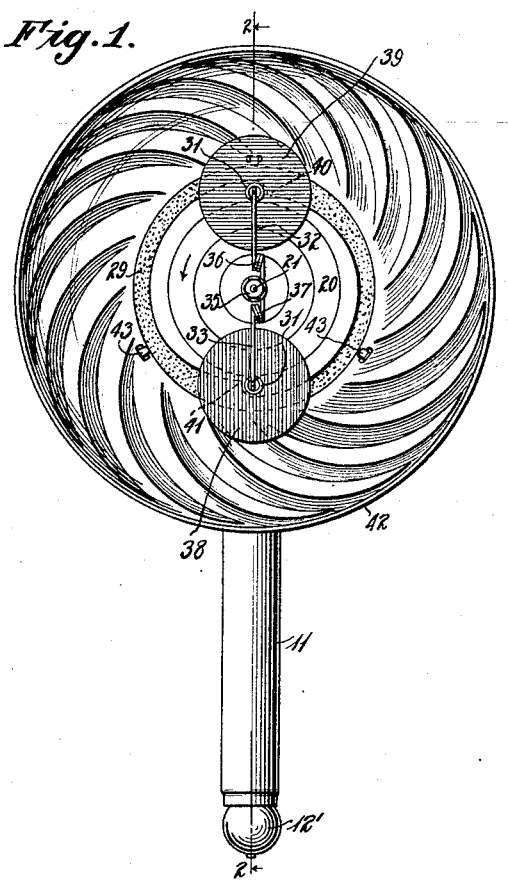
Fig. 1 is a front elevation.

As shown the device comprises a frame 10, carrying a handle 11, which handle is preferably hollow to permit the passage therethrough of a flexible operating member 12, the end of which member is provided with a sphere or button 12' to prevent its retraction within the handle.

A disc 13 is shown mounted upon the frame 10, and the frame and disc may be formed of a single piece of material in the form of a disc with a strap projecting therefrom, the strap being bent at an angle at 14 to provide a horizontal portion 15 to which the handle 12 is attached. The strap is then again bent at 16 to produce a vertical portion of the frame, and again at 17 to provide the portion 18 which may be secured to the disc 13 as by means of a tab 19.

A momentum member 20 is shown journaled in the disc 13 upon a stub shaft 21 which carries upon its rear portion a pinion 22. To drive the momentum member 20, a gear wheel 23 is shown, mounted upon a shaft 24, journaled in the vertical portion of the frame at one end and in the disc 13 at its opposite end. The gear wheel 23 is rigidly secured to the shaft 24. A drum 25 is loosely mounted upon the shaft 24 and is adapted to drive the gear 23 when revolved in one direction by means of the pawls 26 pivoted upon the drum, coacting with the ratchet wheel 27 carried by the gear wheel. A coiled spring 28 slipped over the shaft 24 has one end anchored to the frame 10, and its opposite end anchored to the drum 25, whereby the drum is returned to normal position and the flexible member 12 is rewound thereon. By grasping the member 12' and pulling upon the flexible member 12, which is wound upon the drum 25 and one end anchored thereto, the drum will be revolved, thereby causing revolution of the member 20. When the member 12 is slacked it will be rewound, and the momentum of the member 20 will cause the same to continue to spin between impulses given by successive pulls upon the member 12.

To produce sparks a band of abradant material is carried by one of the relatively rotative parts. As shown the band of abradant material 29 is mounted upon the disc 13, and pieces of pyrophoric material 30, mounted in cylindrical sockets 31 carried by the momentum member 20 are pressed against the abradant material as by means of spring members 32, 33. The spring members may be formed from a single length of wire having its central portion formed into a coil 34 mounted, and retained, on the shaft 21 by means of a nut 35. The springs of the wire are shown as formed into coils 36, 37 for increase of flexibility of the spring, and the ends of the springs project through slots in the cylinders 31, and bear on the pyrophoric element 30.

To provide a show of color from the sparks, colored discs of translucent material 38, 39 are shown as loosely mounted upon the sockets 31. The momentum member 20 is shown as formed to provide recesses 40, 41 to permit a clear view of the sparks formed when the momentum member 20 is revolved in the direction of the arrow in Figure 1.

Figure 2:
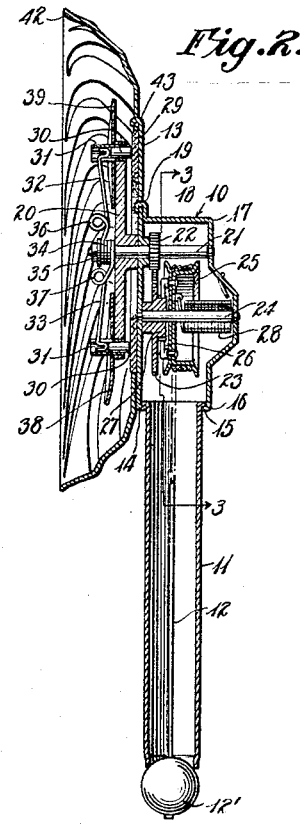
Fig. 2 is a central vertical section on line 2—2 of Figure 1.
Figure 3:
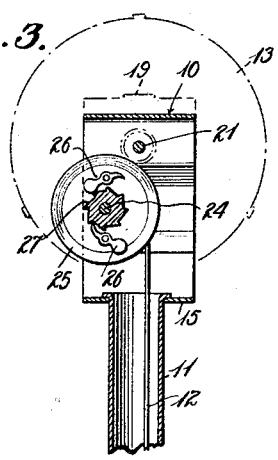
Fig. 3 is a detail vertical section on line 3—3 of Figure 2.
Figure 4:
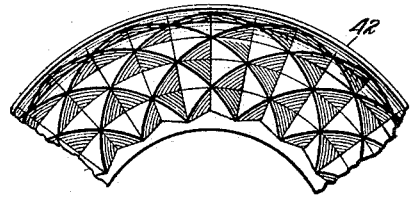
Fig. 4 is a detail elevation of a portion of a modified form of reflecting surface.

To reflect the rays of light emitted by the sparks, a concave reflector 42 is shown as secured to the disc 13. A desirable manner of securing the reflector is by the projection of tabs 43 formed upon the disc 13, through openings in the reflector, and the clinching of the tabs upon the front surface of the reflector. As shown in Figures 1 and 2 the surface of the reflector is provided with depressions upon arcs of circles so formed as to give the impression of motion in the direction of revolution of the momentum member 20. A modified form of surface is shown in Figure 4, wherein the depressions are produced by intersecting arcs to produce diamond shaped depressions, and, therefore, many facets from which the rays of light may be reflected. The reflector is preferably formed with a highly polished surface to more effectually reflect light.

Minor changes may be made in the physical embodiment of the invention without departing from its spirit.

I claim:

1. A toy comprising, in combination, a stationary member, a revoluble member mounted thereon, means to actuate said revoluble member, coacting means carried by said members to cause sparks to be thrown tangentially upon relative movement between said members, a reflector carried by one of said members to reflect the light of said sparks, and spirally formed serrations upon the surface of said reflectors forming continuation of tangents to the path of revolution of said revoluble member to enhance the appearance of revolution by reflection of said light.

2. A toy, comprising, in combination, a stationary member, a momentum member mounted thereon, for revolution, means to actuate said momentum member, an abradant surface carried by one of said members, a pyrophoric element carried by the other of said members, a reflector carried by one of said members to reflect the light emitted by sparks caused by actuation of the device whereby to increase the illuminating effect thereof, and serrations carried by the surface of said reflector forming substantial continuations of tangents to the path of revolution of said momentum member, said serrations enhancing the appearance of revolution of said reflections.

3. A toy, comprising, in combination, a frame, a handle mounted upon said frame, a disc carried by said frame, a momentum member journaled upon said disc, means carried by said frame to cause revolution of said momentum member, an abradant surface carried by said disc, pyrophoric elements carried by said momentum member, colored translucent material mounted upon the device to produce a colored effect of sparks caused by actuation of the device, a reflector mounted upon said disc to enhance the illumination produced by said sparks, and serrations carried by the surface of said reflector forming substantial continuations of tangents to the path of revolution of said momentum member, said serrations enhancing the appearance of revolution of said reflections.

4. A toy comprising, in combination, a member having an opening, a covering of colored translucent material for said opening, a pyrophoric material holding member adjacent said opening, a circular band of abradant material, means to cause relative movement of revolution between said last-named member and band whereby sparks may be produced to show through said colored material, a concave reflector mounted upon one of said members, containing said members in its concavity whereby to increase the effect of illumination by reflecting the light from the individual sparks produced, and spirally formed serrations upon said reflector forming substantial continuations of tangents to said band acting to enhance the effect of revolution of said spark producing means.

LOUIS V. ARONSON.